(12) United States Patent
Minowa

(10) Patent No.: US 7,973,396 B2
(45) Date of Patent: Jul. 5, 2011

(54) ELECTRONIC PRICE TAG DEVICE, POP DEVICE, MANAGEMENT SYSTEM FOR ELECTRONIC PRICE TAG DEVICE, AND METHOD AND PROGRAM FOR CONTROLLING MANAGEMENT SYSTEM FOR ELECTRONIC PRICE TAG DEVICE

(75) Inventor: Masahiro Minowa, Hatamachi (JP)

(73) Assignee: Seiko Epson Corporation, Tokyo (JP)

( * ) Notice: Subject to any disclaimer, the term of this patent is extended or adjusted under 35 U.S.C. 154(b) by 309 days.

(21) Appl. No.: 12/439,160

(22) PCT Filed: Jun. 4, 2007

(86) PCT No.: PCT/JP2007/000595
§ 371 (c)(1),
(2), (4) Date: Feb. 26, 2009

(87) PCT Pub. No.: WO2008/026303
PCT Pub. Date: Mar. 6, 2008

(65) Prior Publication Data
US 2009/0198508 A1    Aug. 6, 2009

(30) Foreign Application Priority Data

Aug. 31, 2006  (JP) .................................. 2006-235148
Dec. 4, 2006   (JP) .................................. 2006-326570

(51) Int. Cl.
*H01L 23/02* (2006.01)

(52) U.S. Cl. ........................................ 257/679; 257/922
(58) Field of Classification Search .................. 257/679, 257/680, 684, 723, 724, 728, 731, 922; 235/492; 712/26
See application file for complete search history.

(56) References Cited

U.S. PATENT DOCUMENTS
5,448,226 A    9/1995  Failing, Jr. et al.

FOREIGN PATENT DOCUMENTS
| JP | 03-046696 A | 2/1991 |
| JP | 2000-287798 A | 10/2000 |
| JP | 2004-361729 A | 12/2004 |
| JP | 2005-258876 A | 9/2005 |

*Primary Examiner* — Thanh V Pham
(74) *Attorney, Agent, or Firm* — Kilpatrick, Townsend & Stockton LLP

(57) ABSTRACT

The present invention provides a solution to the following problem: when using an electronic price tag device attached to a POP panel, an advertising content of the POP panel may be inconsistent with a price displayed on the electronic price tag device, and such inconsistency is left as is until a person in charge of a store site notices that. An electronic price tag device 1 includes detecting elements SW1 to SW3. A POP panel 30 is provided with a projected and recessed part 33 at a position, with the electronic price tag device 1 attached thereto, facing a detecting unit 16. The projected and recessed part 33 is formed to have different shapes corresponding to the types of the POP panel. Type information of the POP panel based on a signal output from the detecting elements SW1 to SW3 engaged with the projected and recessed part 33 is output to a display 4.

13 Claims, 11 Drawing Sheets

(TYPE INFORMATION)　　　　　　　　　(PRICE ATTRIBUTION INFORMATION)

→ RECOMMENDED ITEM OF STORE MANAGER

→ 30% OFF

→ SALE ITEM OF THE DAY

→ TIME LIMITED SALE

→ MOST POPULAR ITEM

→ SALE ITEM OF THE WEEK

F I G. 5
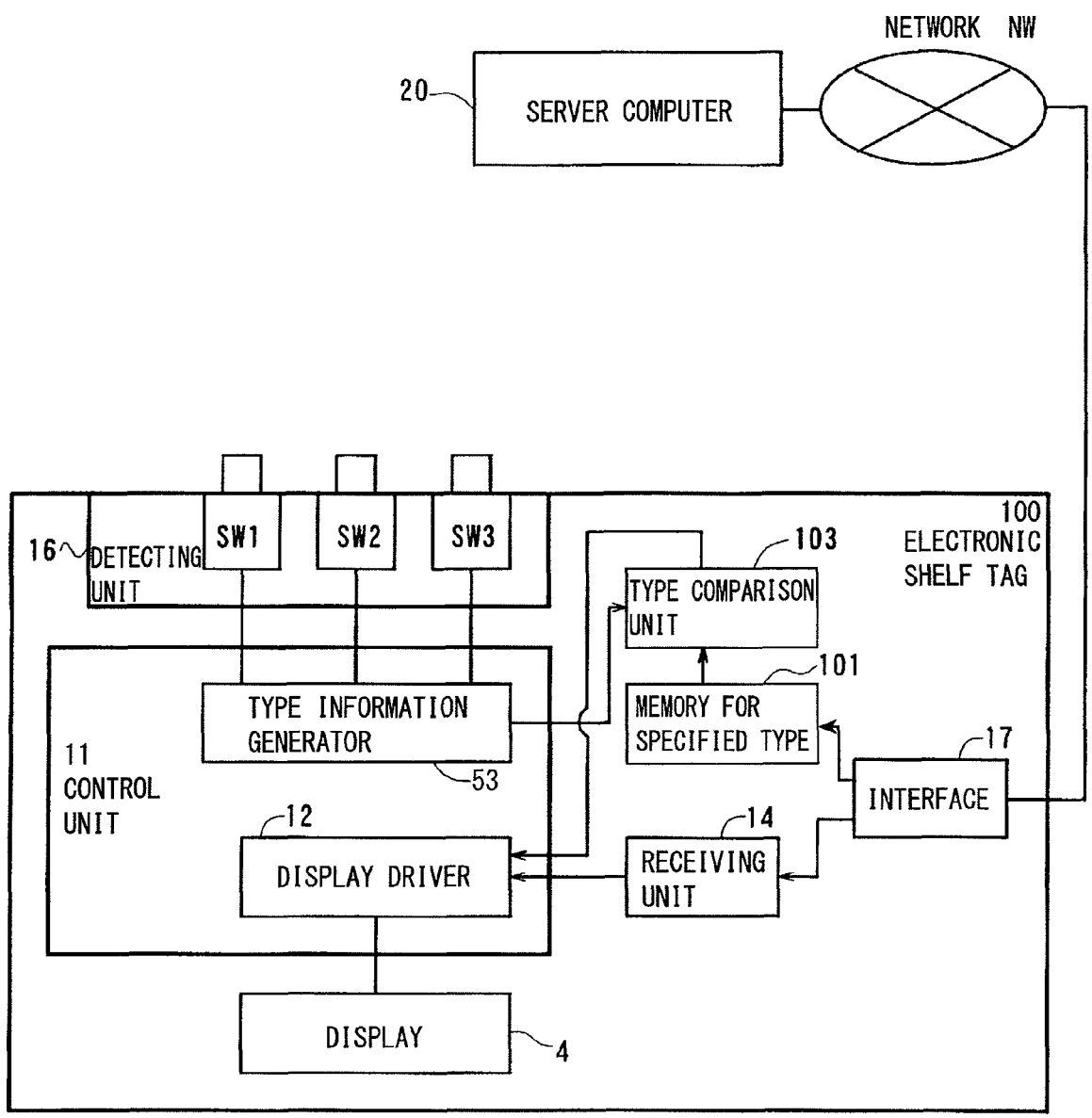

F I G. 9
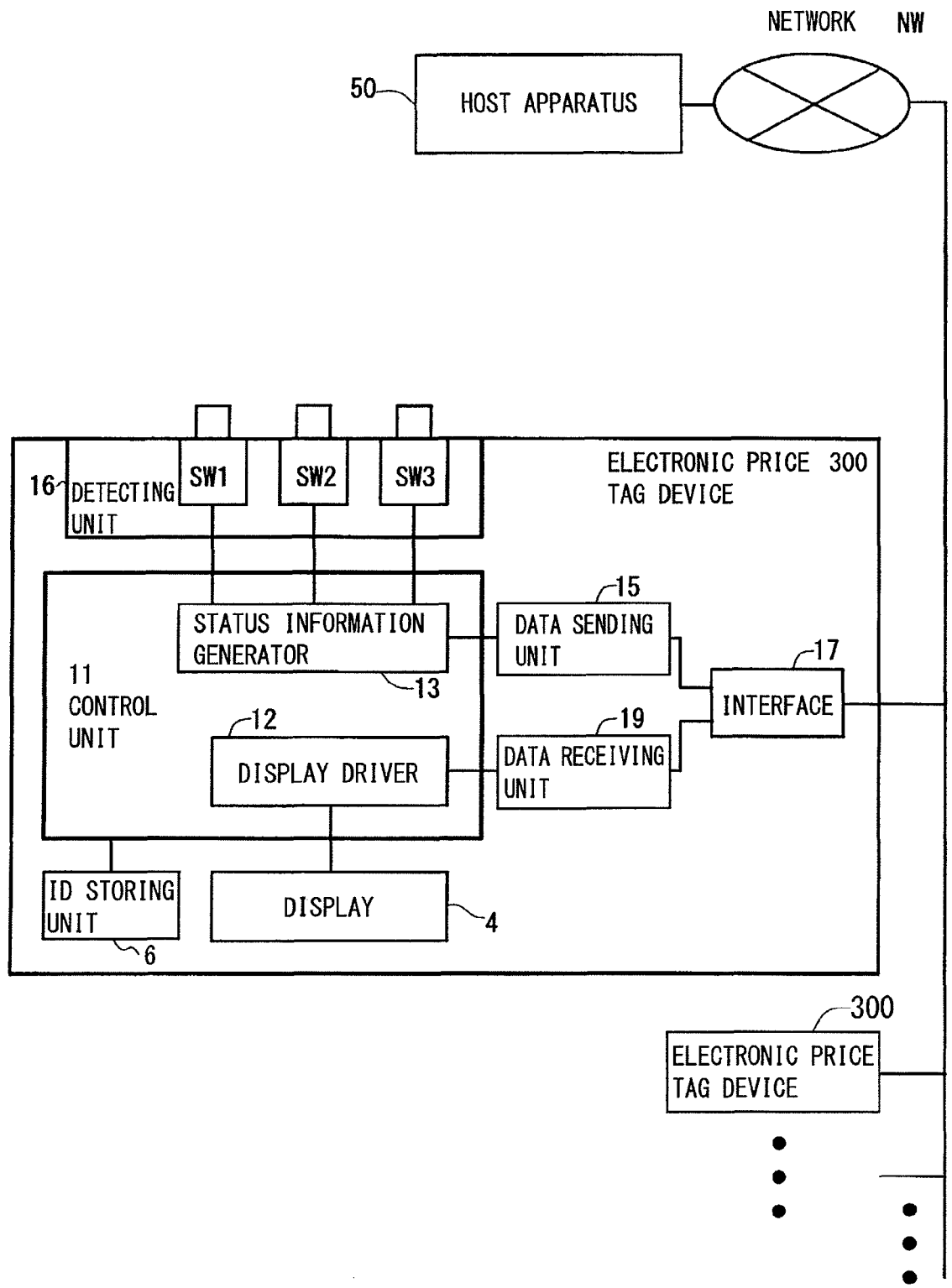

F I G. 1 1
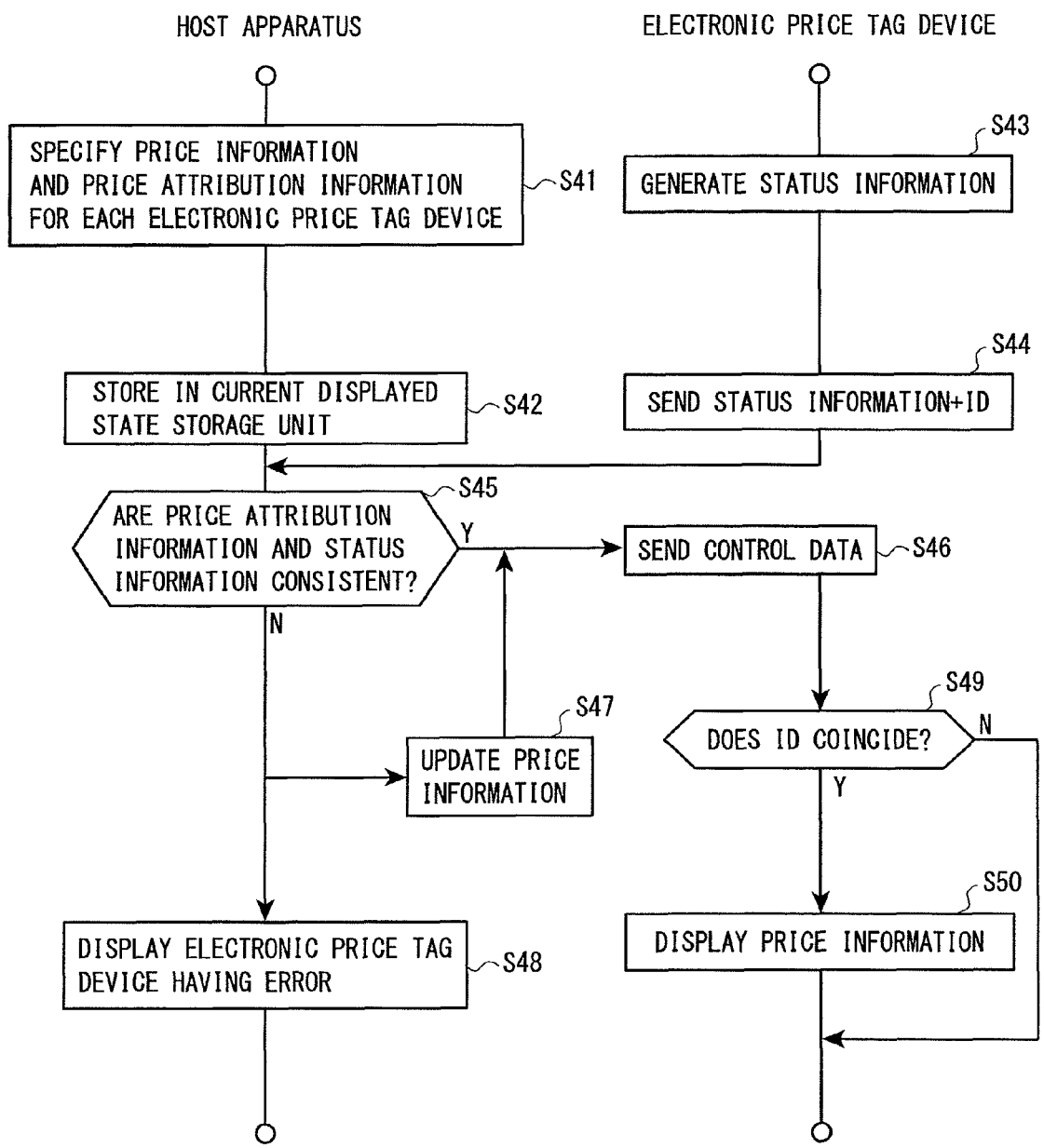

ELECTRONIC PRICE TAG DEVICE, POP DEVICE, MANAGEMENT SYSTEM FOR ELECTRONIC PRICE TAG DEVICE, AND METHOD AND PROGRAM FOR CONTROLLING MANAGEMENT SYSTEM FOR ELECTRONIC PRICE TAG DEVICE

TECHNICAL FIELD

The present invention relates to an electronic price tag device, a POP device, a management system for the electronic price tag device, and a method and program for controlling the management system for the electronic price tag device.

BACKGROUND ART

An electronic price tag device is coupled to a host apparatus by use of a wireless connection or a cable, and displays a price and other information instructed from the host apparatus.

The electronic price tag device is generally so small-sized that it is difficult for the electronic price tag device to be taken notice of only its displayed price. Then, the electronic price tag device is often used by being attached to a POP panel. The POP panel represents any advertisement that attracts public notices, for example, advertisements for sale items, recommended items, and limited time sale items, or the like.

When the electronic price tag device is used by being attached to the POP panel, an advertising content of the POP panel might be inconsistent with a price displayed on the electronic price tag device. For example, an electronic price tag device that displays a price of a recommended item may be attached to a POP panel that displays a sale item.

In order to prevent such a mistake, an electronic price tag device has been proposed in which a display unit displays a POP advertising type thereon (see Patent Document 1). By making it possible to visually check whether the display of the electronic price tag device coincides with the content of the POP panel, consistency of a combination of the POP panel and the electronic price tag device has been aimed at.
[Patent Document 1] JP-A-2004-361729

DISCLOSURE OF THE INVENTION

Problems to be Solved

However, since the display unit of the electronic price tag device has a smaller area, the POP advertising type displayed thereon also becomes smaller. Consequently, the combination of the POP panel and the electronic price tag device may be visually mistaken. Even when the combination of the electronic price tag device and the POP panel has an abnormality, the abnormality is left as is until a person in charge of a store site notices that.

Means to Solve the Problems

In view of the above-mentioned problem, the present invention provides a first aspect of the invention described below. That is, an electronic price tag device according to the first aspect is formed so as to be attachable to a POP panel, and includes a detecting unit that detects a panel identification unit of the POP panel, and an outputting unit that outputs a type of the POP panel that is a detected result of the detecting unit.

With the electronic price tag device of the first aspect thus described, the outputting unit outputs the type of the POP panel that is the detected result by the detecting unit of the electronic price tag device. Therefore, inconsistency can be revealed if a combination of the electronic price tag device and the POP panel has any inconsistency. Consequently, inconsistency between a content displayed on the POP panel and a price displayed on the electronic price tag device can be securely prevented.

A second aspect of the invention is described below. That is, in the electronic price tag device described by the first aspect, the detecting unit includes a switch, and the switch engages with the panel identification unit provided to the POP panel to output an ON signal or OFF signal. The detecting unit identifies the type of the POP panel based on the ON signal or OFF signal.

With the electronic price tag device of the second aspect thus described, the detecting unit is formed to have the switch, thereby simplifying the configuration of the detecting unit. Consequently, the electronic price tag device can be provided inexpensively.

A third aspect of the invention is described below. That is, in the electronic price tag device described by the first or second aspect, the outputting unit sends the type of the POP panel to a central management device.

With the electronic price tag device of the third aspect thus described, if the combination of the electronic price tag device and the POP panel has inconsistency, the inconsistency can be detected also by the central management device. Consequently, the inconsistency between the electronic price tag device and the POP panel can be double-checked by an on-site person in charge of a store and an administrator of the central management device, and the inconsistency between the content displayed on the POP panel and the price displayed on the electronic price tag device can be prevented more securely.

A fourth aspect of the invention is described below. That is, in the electronic price tag device of the second aspect, the detecting unit has a plurality of detecting elements, and the detecting unit is formed to detect whether the POP panel is mounted, as well as the type of the POP panel.

With the electronic price tag device of the fourth aspect thus described, it is also easy to check when the POP panel is not mounted in spite of a case that the POP panel is supposed to be mounted.

A fifth aspect of the invention is described below. That is, a POP panel according to the fifth aspect is to be attached with an electronic price tag device including a detecting unit, and includes a panel identification unit provided at a position, with the electronic price tag device attached thereto, facing the detecting unit of the electronic price tag device.

With the POP panel of the fifth aspect thus described, the display function of the electronic price tag device provided with the detecting unit can be reinforced, and effective displaying of commodity information can be achieved.

A sixth aspect of the present invention is described below. That is, in the POP panel described by the fifth aspect, the detecting unit of the electronic price tag device is a mechanical switch, and the panel identification unit is a projected and recessed part that engages with the switch to turn the switch to an ON state or OFF state.

With the POP panel of the sixth aspect thus described, it is possible to effectively operate the electronic price tag device having the detecting unit formed of the mechanical switch. Since the detecting unit formed of the mechanical switch has a simple configuration, it is possible to provide the electronic price tag device itself inexpensively. In other words, the POP panel enables the use of an inexpensive electronic price tag device.

In the above-mentioned aspect, the POP panel has a POP advertisement display unit, a mounting part for the electronic price tag device, and a panel identification unit.

The POP advertisement display unit represents the content of the POP advertisement, i.e., a message for customers. For example, the message includes sale items, recommended items, or limited time sale items.

The mounting part of the electronic price tag device is suitably designed depending on the configuration of the electronic price tag device. In an embodiment, an opening is formed in the POP panel, and the electronic price tag device is inserted into this opening to be attached so as to enable free attachment and detachment. Alternatively, the electronic price tag device may be attached to a surface or periphery of the POP panel so as to enable free attachment and detachment.

The panel identification unit is disposed to face the detecting unit of the electronic price tag device in a condition that the electronic price tag device is attached to the POP panel. The panel identification unit can be suitably designed as long as the type of the POP panel can be distinguished.

In an embodiment of the present invention, the projected and recessed part is used as the panel identification unit, which the projected and recessed part engages with the mechanical switch corresponding to the detecting unit formed of the mechanical switch as the detecting element. When using a photo sensor as the detecting element, ON or OFF can be specified by use of the projected and recessed part or a reflecting member.

When using an image reader for the detecting unit, characters, symbols, or a one-dimensional or two-dimensional bar code can be represented in the panel identification unit. When using a magnetic sensor for the detecting unit, a magnetic generating member (permanent magnet, etc.) can be provided in the panel identification unit.

The shape and material of the POP panel can be suitably designed. The POP panel can be also formed in three dimensions. Two or more electronic price tag devices can be attached to one POP panel. Two or more POP advertisement display units can be provided in one POP panel.

A seventh aspect of the present invention is described below. That is, a management system for an electronic price tag device according to the seventh aspect includes: an electronic price tag device that electronically displays at least a price of a commodity and is formed so as to be attachable to a POP panel; and a host apparatus having a function to send price information of the commodity corresponding to the electronic price tag device; wherein the electronic price tag device includes: a detecting unit that detects a panel identification unit of the POP panel; and a sending unit that sends a type of the POP panel that is a detected result by the detecting unit; and the host apparatus includes: a specification unit that specifies a type of the electronic price tag device; a comparison unit that compares the specified type of the electronic price tag device with the type of the POP panel received from the electronic price tag device; and a warning displaying unit that displays a warning when the specified type of the electronic price tag device is inconsistent with the type of the POP panel received from the electronic price tag device.

With the management system for the electronic price tag device of the seventh aspect thus described, the warning is issued when the type of the POP panel received from the electronic price tag device in the host apparatus is inconsistent with the specified type of electronic price tag device as the result of comparison. Therefore, the consistency can be checked on the host apparatus side.

An eighth aspect of the present invention is described below. That is, a management system for an electronic price tag device according to the eighth aspect includes: an electronic price tag device that electronically displays at least a price of a commodity and is formed so as to be attachable to a POP panel; and a host apparatus having a function to send price information of the commodity corresponding to the electronic price tag device; wherein the host apparatus includes: a specification unit that specifies a type and price of the electronic price tag device; and a sending unit that sends the specified type and price of the electronic price tag device; and the electronic price tag device includes: a detecting unit that detects a panel identification unit of the POP panel; a comparison unit that compares a type of the POP panel that is a detected result by the detecting unit with the type of the electronic price tag device received from the host apparatus; and a display unit that displays the received price when the type of the POP panel coincides with the type of the electronic price tag device and that displays a warning when the type of the POP panel does not coincide with the type of the electronic price tag device.

With the management system for the electronic price tag device of the eighth aspect thus described, the warning is issued when, in the electronic price tag device, the type of the POP panel that is the detected result by the detecting unit is inconsistent with the type of the electronic price tag device received from the host apparatus as a result of comparison. Therefore, the consistency can be checked on the electronic price tag device side.

A ninth aspect of the invention is described below. That is, according to the ninth aspect of the invention in the management system for an electronic price tag device described by the eighth aspect, the electronic price tag device further includes a sending unit that sends a comparison result when the type of the POP panel and the type of the electronic price tag device do not coincide on a basis of the comparison result of the comparison unit, and the host apparatus further includes a display unit that displays the comparison result received from the electronic price tag device.

With the management system for an electronic price tag device of the ninth aspect thus described, the type of the POP panel is compared with the type of the electronic price tag device sent from the host apparatus, and the comparison result is sent when the type of the POP panel is inconsistent with the type of the electronic price tag device. Consequently, the consistency can be checked on both of the electronic price tag device and the host apparatus sides.

A tenth aspect of the present invention is described below. That is, a management system for an electronic price tag device according to the tenth aspect includes: a plurality of electronic price tag devices, each of which electronically displays at least a price of a commodity and is formed so as to be attachable to a POP panel; and a host apparatus having a function to send commodity information including price information of the commodity corresponding to the plurality of electronic price tag devices; wherein the POP panel includes a panel identification unit that indicates type information corresponding to a content displayed by the POP panel; the electronic price tag device includes: a data receiving unit that receives control data including the commodity information from the host apparatus; a display unit that displays at least the price information included in the commodity information; a detecting unit that detects the panel identification unit of the POP panel; and a data sending unit that outputs status information, including existence of the POP panel and the type information of the POP panel that are detected results by the detecting unit, to the host apparatus; and the host apparatus includes: a price data storage unit that stores at least each piece of the price information of the electronic price tag devices in accordance with price attribution information; a control data sending unit that sends control data including the commodity information to the electronic price tag device; a status information acquiring unit that acquires the status information from the electronic price tag device; and an update commodity information outputting unit that sends the commodity information corresponding to the type information of the POP panel to the electronic price tag device based on the status information.

With the management system for an electronic price tag device of the tenth aspect thus described, the electronic price tag device detects the panel identification unit of the POP panel attached to the electronic price tag device, and sends the status information including the type information of the POP panel to the host apparatus. Having acquired the status information, the host apparatus sends update commodity information to the electronic price tag device based on existence and the type information of the POP panel that are included in the status information. The update commodity information includes the price information corresponding to the detected type of the POP panel.

Therefore, even when an inadequate electronic price tag device is mounted on the POP panel, the host apparatus automatically updates the price displayed on the electronic price tag device. Consequently, inconsistency between the advertising content of the POP panel and the content displayed on the electronic price tag device can be securely avoided without putting any load on the person in charge, and the content displayed on the electronic price tag device can be updated.

An eleventh aspect of the present invention is described below. That is, in the management system for an electronic price tag device described by the tenth aspect, the host apparatus further includes a POP panel collating unit that collates the type information of the POP panel included in the status information with the price attribution information, the POP panel collating unit outputs an information update command when the type information is inconsistent with the price attribution information, and the update commodity information outputting unit sends the commodity information to a predetermined electronic price tag device according to the information update command.

With the management system for an electronic price tag device of the eleventh aspect thus described, even when an inadequate electronic price tag device is mounted on the POP panel, the POP panel collating unit automatically collates the type of the POP panel mounted on the electronic price tag device. Then, when the type information of the POP panel is inconsistent with the price attribution information, the POP panel collating unit outputs the information update command that is a signal indicating that there is inconsistency between both information to the update commodity information outputting unit. According to this information update command, the update commodity information outputting unit sends the commodity information to a predetermined electronic price tag device. The electronic price tag device, which has received the commodity information, displays a list price included in the commodity information. Thus, with the management system for an electronic price tag device according to the eleventh aspect, the list price of the electronic price tag device can be automatically updated.

Consequently, the inconsistency between the advertising content of the POP panel and the content displayed on the electronic price tag device can be securely avoided without burdening on the person in charge, and the displayed content can be updated.

A twelfth aspect of the present invention is described below. A method for controlling a management system for an electronic price tag device that includes: a plurality of electronic price tag devices, each of which electronically displays at least a price of a commodity and is formed so as to be attachable to a POP panel; and a host apparatus having a function to send commodity information including price information of the commodity corresponding to the plurality of electronic price tag devices; includes: detecting existence of the POP panel and a type of the POP panel; acquiring status information of the electronic price tag device including information on existence of the POP panel and the type of the POP panel that are detected; and sending the commodity information corresponding to the type information of the POP panel to the electronic price tag device based on the acquired status information.

With the method for controlling a management system for an electronic price tag device of the twelfth aspect thus described, the host apparatus acquires the type information of the POP panel, and sends the commodity information corresponding to the type information of the POP panel to the electronic price tag device. Therefore, even when an inadequate electronic price tag device is mounted on the POP panel, the host apparatus automatically updates the price displayed on the electronic price tag device. Consequently, the inconsistency between the advertising content of the POP panel and the content displayed on the electronic price tag device can be securely avoided without putting any load on the person in charge, and the content displayed on the electronic price tag device can be updated.

A thirteenth aspect of the present invention is described below. That is, a computer program according to the thirteenth aspect that enables a computer controlling a management system for an electronic price tag device that includes a plurality of electronic price tag devices, each of which electronically displays at least a price of a commodity and is formed so as to be attachable to a POP panel, and a host apparatus having a function to send commodity information including price information of the commodity corresponding to the plurality of electronic price tag devices, to execute the following processes: detecting whether the POP panel is mounted and a type of the POP panel; acquiring status information of the electronic price tag device including information on whether the POP panel is mounted and on the type of the POP panel; and sending the commodity information corresponding to the type information of the POP panel to the electronic price tag device based on the acquired status information.

With the program of the thirteenth aspect thus described, the same operation effects as those in the twelfth aspect can be obtained by installing the program on the management system for an electronic price tag device described by the twelfth aspect.

BRIEF DESCRIPTION OF THE DRAWINGS

FIG. 5 is a configuration diagram of a management system for an electronic price tag device according to another embodiment.

FIG. 9 is a block diagram of the electronic price tag device according to another embodiment.

FIG. 11 is a flow chart showing operation of a management system according to another embodiment.

REFERENCE NUMERALS

1, 100, 200, 300: electronic price tag device; 4: display; 11: control unit; 13: status information generator; 15: data sending unit; 16: detecting unit; 19: data receiving unit; 30: POP panel; 33: projected and recessed part; 70: price data storage unit; 80: data sending and receiving unit; 103: type comparison unit; NW: network; SY: management system

BEST MODES FOR CARRYING OUT THE INVENTION

First Embodiment

Figure 1:
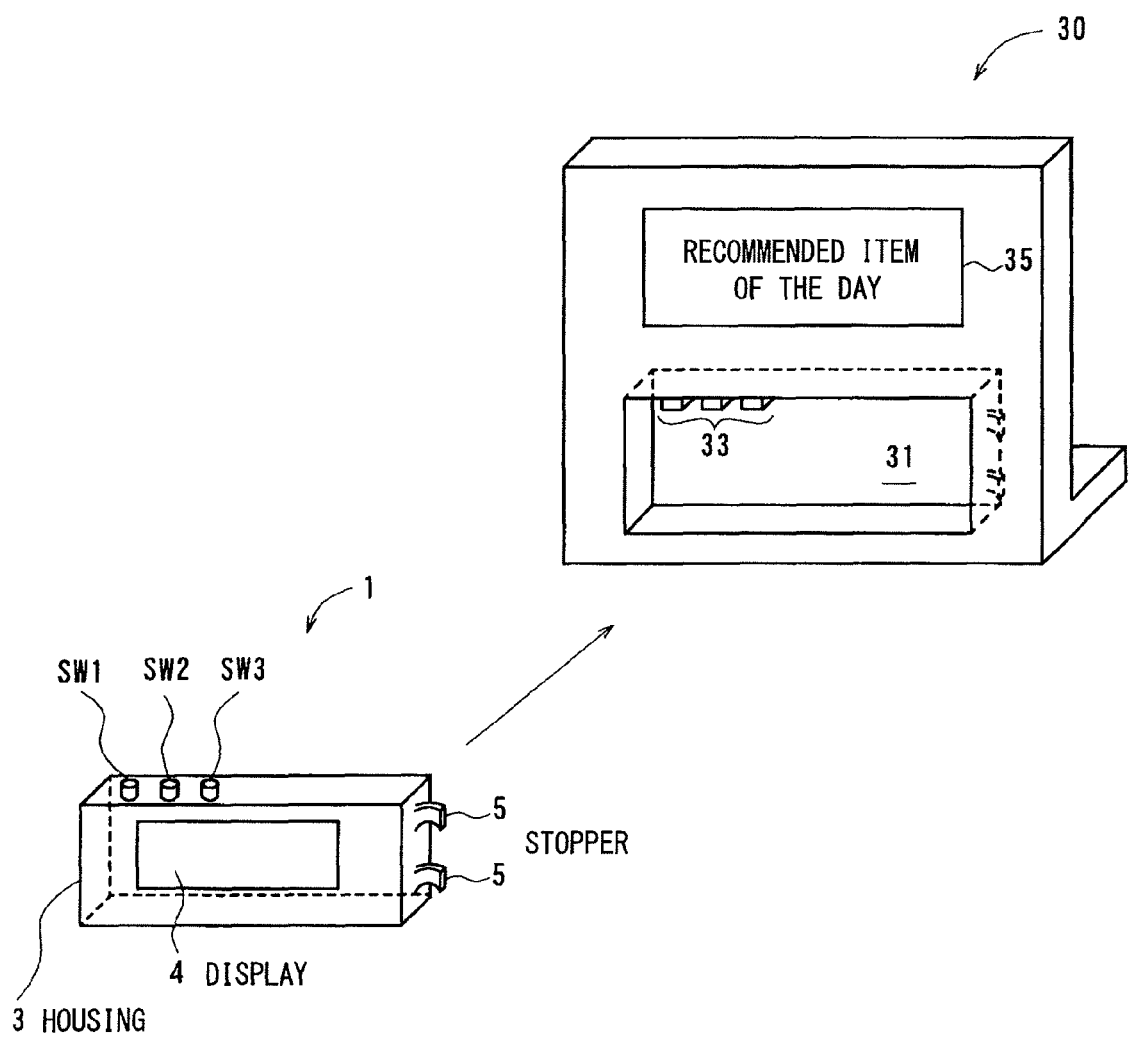
FIG. 1 is a perspective view of an electronic price tag device and a POP panel.

FIG. 1 shows an electronic price tag device 1 and a POP panel 30 according to an embodiment of the present invention.

The electronic price tag device 1 has a housing 3. The housing 3 includes a liquid crystal display 4 in the front face thereof. For the display 4, an organic electroluminescence display or an electronic paper can be also used. A stopper 5 is formed on a side wall of the housing 3, thereby stably engaging the POP panel 30.

Reference numerals SW1, SW2, and SW3 indicate a kind of microswitch for a detecting element. SW1, SW2, and SW3 are projected from the upper surface of the electronic price tag device 1.

Figure 2:
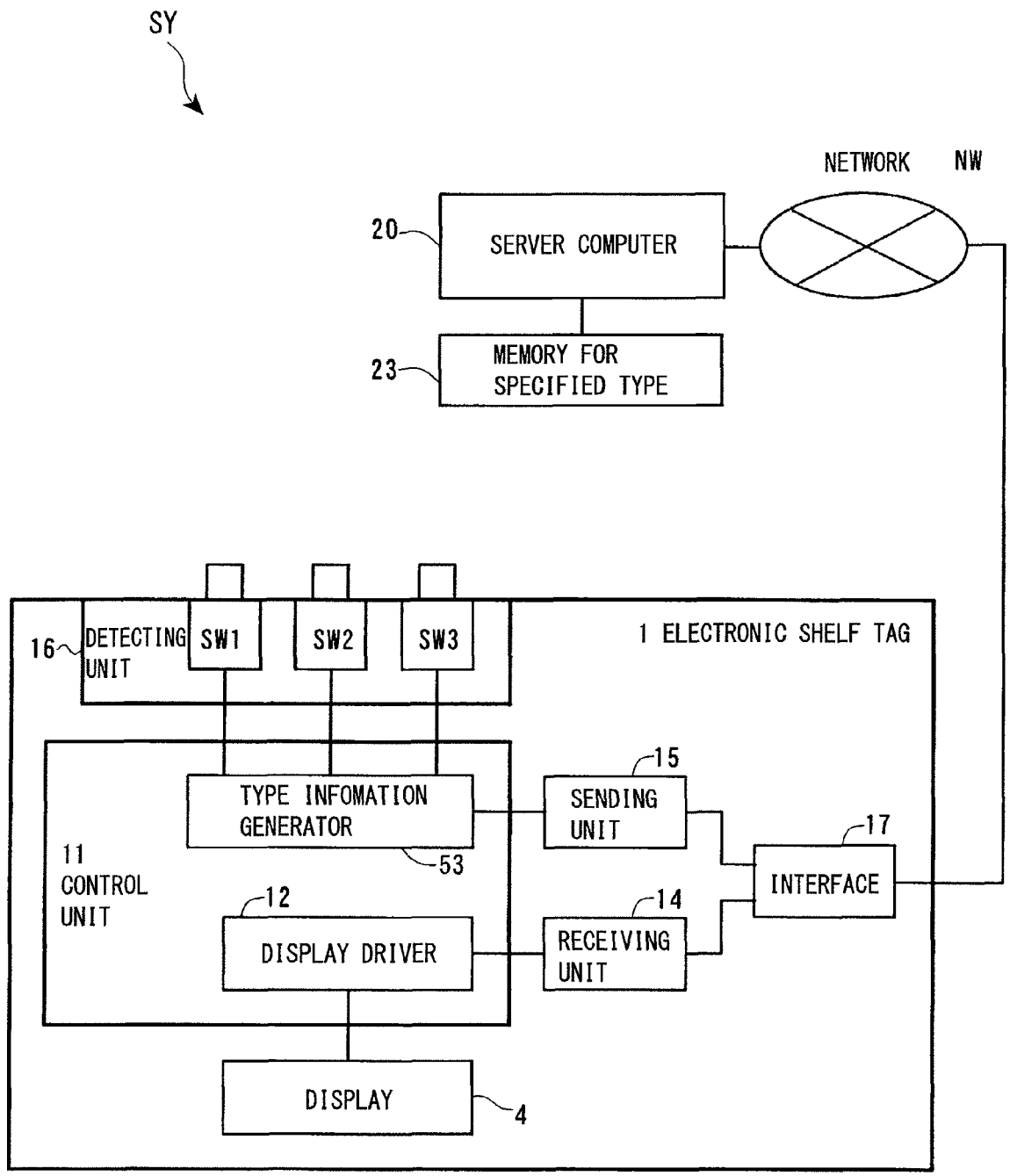
FIG. 2 is a configuration diagram of a management system for the electronic price tag device.

FIG. 2 shows functional elements of the electronic price tag device 1 and a configuration of a management system SY of the electronic price tag device 1.

Reference numeral 11 indicates a control unit. The control unit is connected with a detecting unit 16 having the microswitches SW1, SW2, and SW3, and includes a type information generator 53 that generates type information of the POP panel, a display driver 12, and a data processing unit (not shown). The type information generator 53 sends the type information to a sending unit 15, the type information being an identified result obtained by identifying the type of the POP panel corresponding to an ON or OFF signal from the microswitches SW1, SW2, and SW3. The sending unit 15 outputs this type information to a server computer 20 through an interface 17 and a network NW. The plurality of electronic price tag devices 1 are connected to the server computer 20. The server computer 20 functions as a central management device for these electronic price tag devices 1. In other words, the server computer 20 can set a price to be displayed on the display 4 of the electronic price tag device 1. Additionally, based on an output signal sent from the sending unit 15, the server computer 20 can identify the type of the POP panel.

The electronic price tag device 1 according to this embodiment includes the three microswitches SW1, SW2, and SW3. Each of the microswitches SW1, SW2, and SW3 engages with a projected and recessed part (panel identification unit) 33 formed in a periphery of an opening 31 of the POP panel 30, and can output an ON signal or OFF signal. Based on these signals, theoretically, eight types of the POP panels can be identified.

The POP panel 30 according to this embodiment includes a display unit 35 on the opening 31, and a POP advertisement is represented on the display unit 35. A method of representation can be desirably selected, and methods, such as handwriting and pasting of a printed matter, can be used. A liquid crystal display can be also used for the display unit 35.

Figure 3:
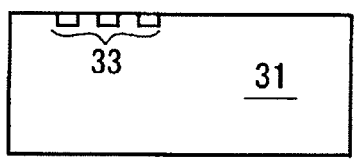
FIG. 3 shows an example of a projected and recessed part (panel identification unit) formed in an opening of the POP panel in accordance with an advertising content of the POP panel.
Figure 3:
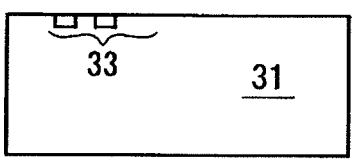
Figure 3:
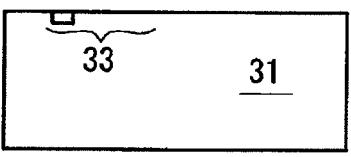
Figure 3:
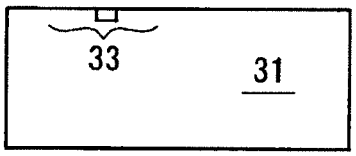
Figure 3:
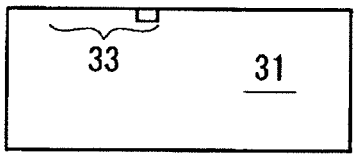
Figure 3:
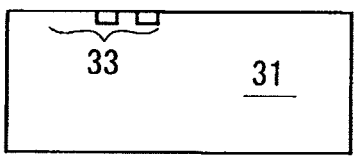

FIG. 3 shows a relationship between a shape of the projected and recessed part as the panel identification unit 33 (type information) and the content of the POP advertisement in the POP panel provided with the panel identification unit 33 (price attribution information). The relationship between the shape of the projected and recessed part and the content of the POP advertisement can be desirably set. Theoretically, use of three detecting elements can set eight types of the cube of 2 for the POP panel. However, when the detecting elements that all have ON or all have OFF are not mounted on the POP panel, seven types of POP panels can be used practically. Similarly, two detecting elements allow use of three types of POP panels, and four detecting elements allow use of 15 types of POP panels.

The type information of the POP panel and the content of the POP advertisement (price attribution information) have a one-to-one relationship.

Figure 4:
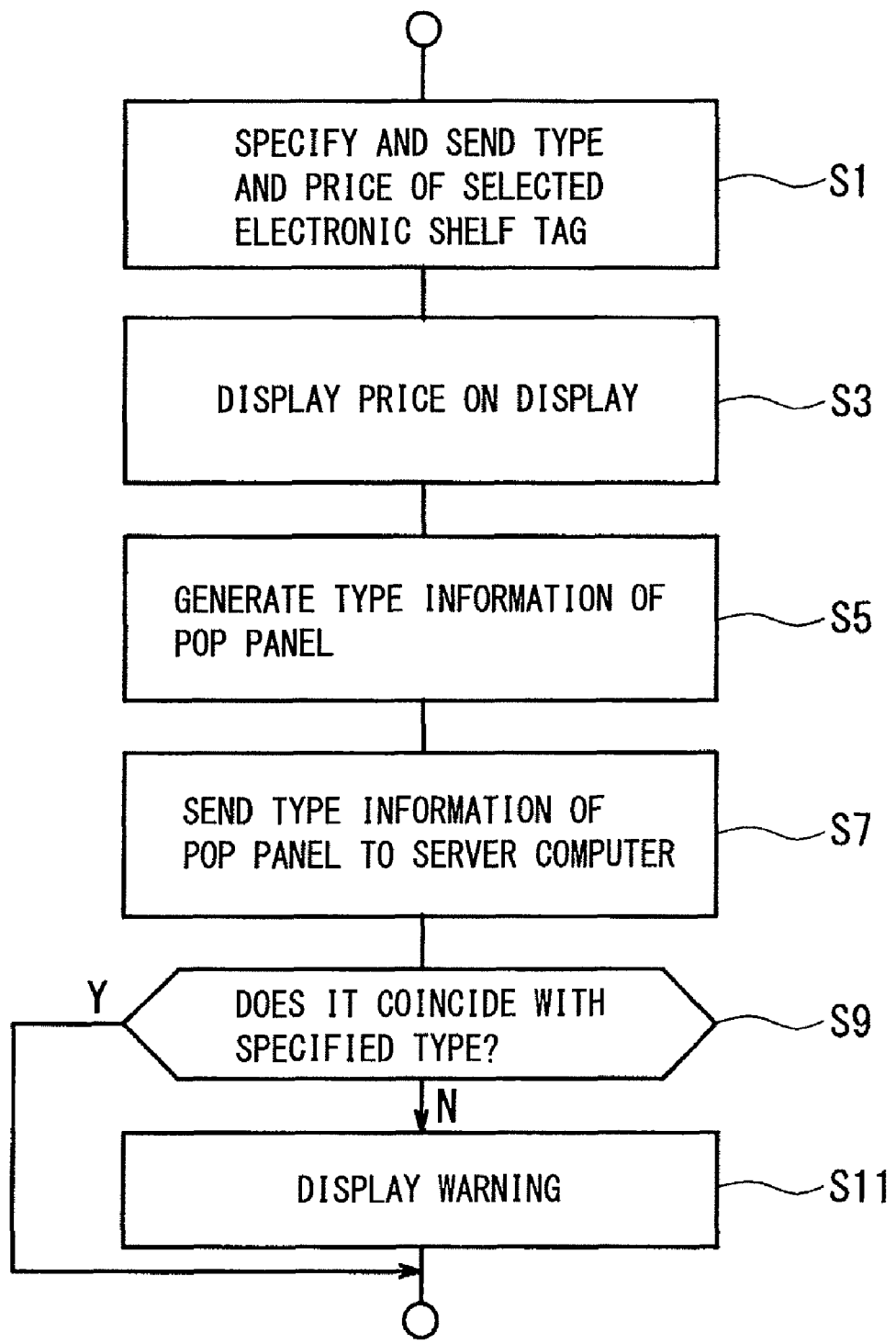
FIG. 4 is a flow chart showing operation of the electronic price tag device.

Next, operation of the electronic price tag device 1 according to the present embodiment will be described with reference to a flow chart in FIG. 4.

The electronic price tag device is selected in the server computer 20, and the type and the price to be displayed are specified (Step S1). Here, the type indicates the type of the POP panel to which the selected electronic price tag device is attached. The specified type is stored in a memory 23. In this embodiment, a type of POP advertisement with which a message "recommended item of store manager" is displayed is stored.

The server computer 20 sends data of the specified price to the selected electronic price tag device 1 through the network NW. The selected electronic price tag device 1 receives the price data, and displays the price data on the display 4 (Step S3).

The housing 3 of the electronic price tag device 1 has a shape slightly smaller than that of the opening 31 of the POP panel 30 The stopper 5 of the housing 3 engages with the side wall of the opening 31 of the POP panel 30, and fits into the periphery of the of the opening 31 to be freely attached and detached in a manner to be clipped using the spring elasticity of the stopper 5.

At this time, the microswitches SW1, SW2, and SW3 of the electronic price tag device 1 are pressed corresponding to the shape of the projected and recessed part 33 formed in the upper periphery of the opening 31. In this embodiment, the projected and recessed part 33 causes all the switches SW1, SW2, and SW3 to be pressed.

At Step S5, the type information generator 53 generates the type information of the POP panel 30 based on a signal from each of the switches SW1, SW2, and SW3 of the detecting unit 16 with all the switches SW1, SW2, and SW3 being pressed. The sending unit 15 sends the generated result to the server computer 20 (Step S7).

The server computer 20 compares the type of the POP panel 30 sent and the type stored in the memory 23, and outputs a warning when both of the types are different from each other (steps S9 and S11). In this embodiment, since the type information of the POP panel 30 generated at Step S5 coincides with the type stored in the memory 23 (recommended item of store manager) as shown in FIG. 3, the warning is not particularly output.

According to this embodiment, in the server computer 20, the specified type in the server computer 20 is compared with the type of the POP panel 30 that is detected when the electronic price tag device 1 is actually attached to the POP panel 30. Therefore, an administrator of the server computer 20 also can check whether the content displayed on the POP panel 30 is consistent with the price displayed on the electronic price tag device 1.

Second Embodiment

FIG. 5 shows a configuration of a management system SY of an electronic price tag device 100 according to another embodiment. The same numerals are given to the same elements, and the description thereof will be partially omitted.

The electronic price tag device 100 includes a memory 101 for a specified type and a type comparison unit 103.

The memory 101 for the specified type stores the type of the POP panel to which the electronic price tag device 100 selected in the server computer 20 is attached.

The type comparison unit 103 compares the type information generated in the type information generator 53 with the type of the POP panel stored in the memory 101 for the specified type. As the result of comparison, when the type information coincides with the type of the POP panel, a commodity price is displayed. When the type information does not coincide with the type of the POP panel, the warning is displayed on the display 4.

Figure 6:
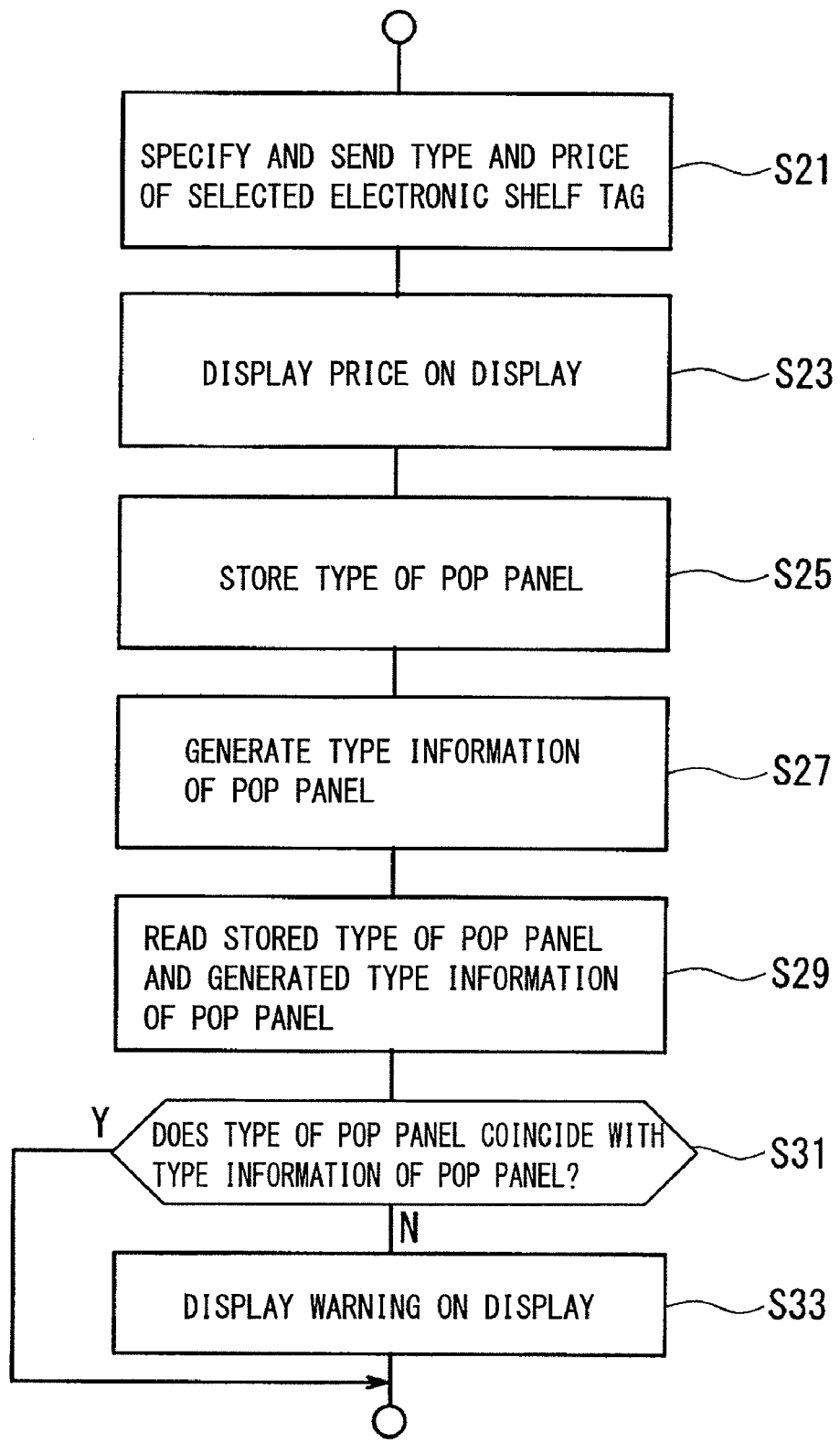
FIG. 6 is a flow chart that shows operation of the electronic price tag device according to another embodiment.

Operation of the electronic price tag device 100 according to the present embodiment will be described with reference to a flow chart in FIG. 6.

The electronic price tag device is selected in the server computer 20, and the type and the price to be displayed are specified (Step S21). In this embodiment, a type to place a POP advertisement "sale item" is specified.

The server computer 20 sends the specified price data and the type of the POP panel to the selected electronic price tag device 100 through the network NW. The selected electronic price tag device 100 receives the price data, and displays the price data on the display 4 (Step S23). Simultaneously, the selected electronic price tag device 100 stores the type of the POP panel in the memory 101 for the specified type (Step S25).

Next, the electronic price tag device 100 is fitted into the opening 31 of the POP panel. At this time, the microswitches SW1, SW2, and SW3 are pressed corresponding to the shape of the projected and recessed part 33 formed in the opening 31. In this embodiment, the projected and recessed part 33 presses only the microswitch SW2. Based on a signal generated by pressing the microswitch SW1, the type information generator 53 generates the type information of the POP panel 30 (Step S27).

Subsequently, the type comparison unit 103 reads the type of the POP panel stored in the memory 101 for the specified type, and simultaneously, reads the type information of the POP panel 30 generated in the type information generator 53 (Step S29). The type comparison unit 103 compares whether the type stored in the memory 101 for the specified type coincides with the generated type information (Step S31). As shown in FIG. 3, the state that the microswitch SW2 is pressed indicates a limited time sale item. On the other hand, the type stored in the specified memory 101 is a sale item. Accordingly, it is determined that the type of the POP panel attached to the electronic price tag device 100 does not coincide with the type stored in the memory 101 for the specified type (Step S31: N). The result is sent to the display driver 12, and the display driver 12 displays the warning on the display 4 (Step S33). When the type information of the POP panel to which the electronic price tag device 100 is attached coincides with the type stored in the memory 101 for the specified type (Step S31: Y), the price sent from the server computer 20 is displayed on the display 4. From a viewpoint of an area for display of the display 4, display by means of a symbol is preferable as display of the type.

Therefore, a store person in charge can check whether the price displayed on the electronic price tag device 100 coincides with the content displayed in the POP panel.

Third Embodiment

Figure 7:
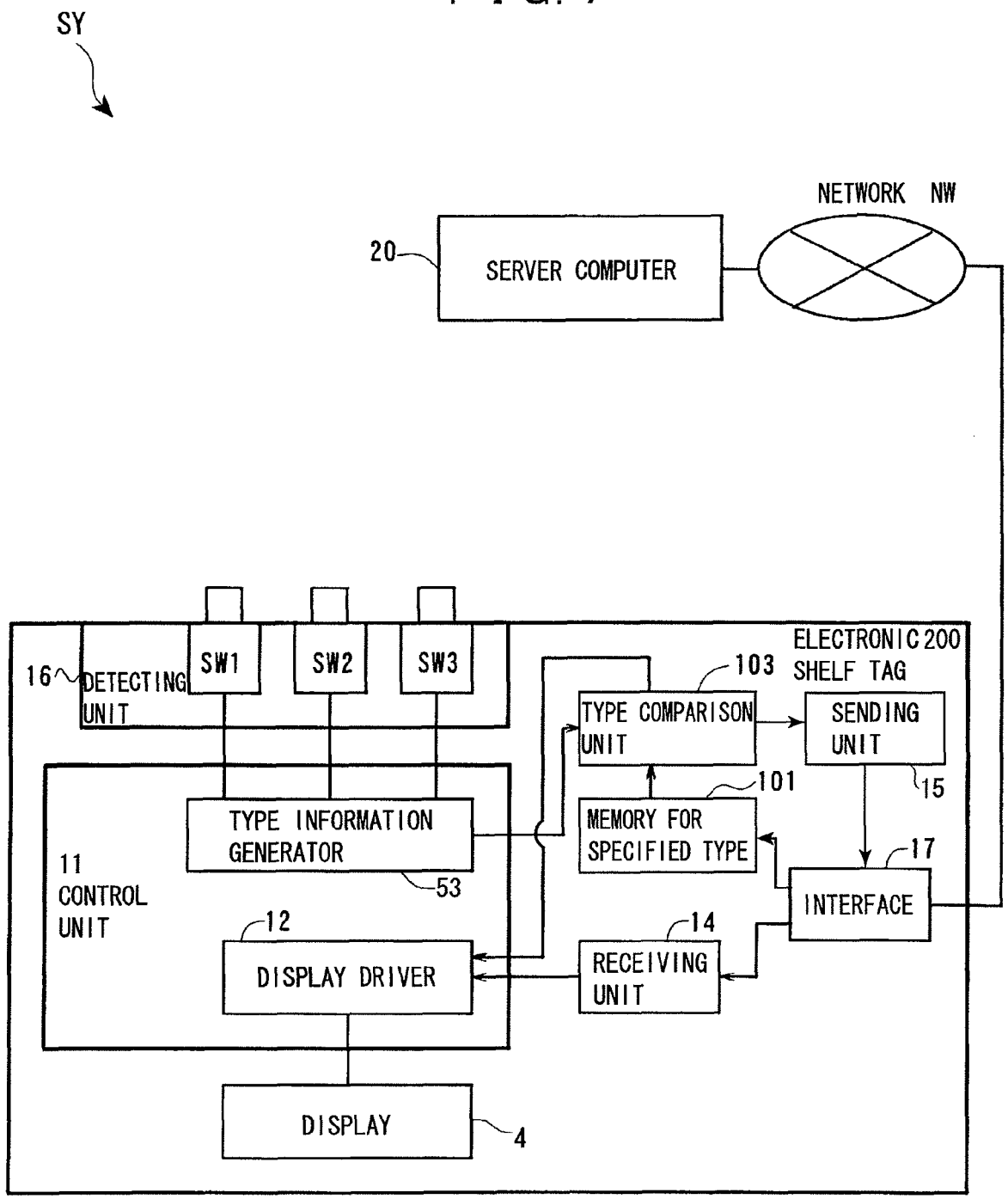
FIG. 7 is a configuration diagram of a management system for an electronic price tag device according to further another embodiment.

FIG. 7 shows a configuration of a management system SY of an electronic price tag device 200 according to another embodiment. The same numerals are given to the same elements as those in FIG. 5, and the description thereof will be omitted.

The electronic price tag device 200 includes the sending unit 15.

The type comparison unit 103 compares the type stored in the memory 101 for the specified type with the type information generated in the type information generator 53. As the result of comparison, when the type stored in the memory 101 for the specified type does not coincide with the type information generated in the type information generator 53, the result is sent to the display driver 12, and simultaneously, the result is also sent to the sending unit 15. The sending unit 15 sends the result to the server computer 20 through the interface 17 and the network NW. The result of comparison is displayed in the server computer.

Therefore, while the store person in charge can check whether the price displayed on the electronic price tag device 200 coincides with the content displayed on the POP panel, the administrator of the server computer 20 can also check that.

In the above-mentioned embodiment, when the type stored in the memory 101 for the specified type is different from the type information generated in the type information generator 53, a signal is output from the sending unit 15, the signal indicating that the type stored in the memory 101 for the specified type is different from the type information generated in the type information generator 53. Alternatively, of course, a configuration is also possible in which a signal indicating that the type stored in the memory 101 for the specified type coincides with the type information generated in the type information generator 53 is output from the sending unit 15 when both coincide. Moreover, the signal indicating that the type stored in the memory 101 for the specified type coincides with the type information generated in the type information generator 53, or an information generation result by the type information generator 53 can be also output to the display 4.

Fourth Embodiment

Figure 8:
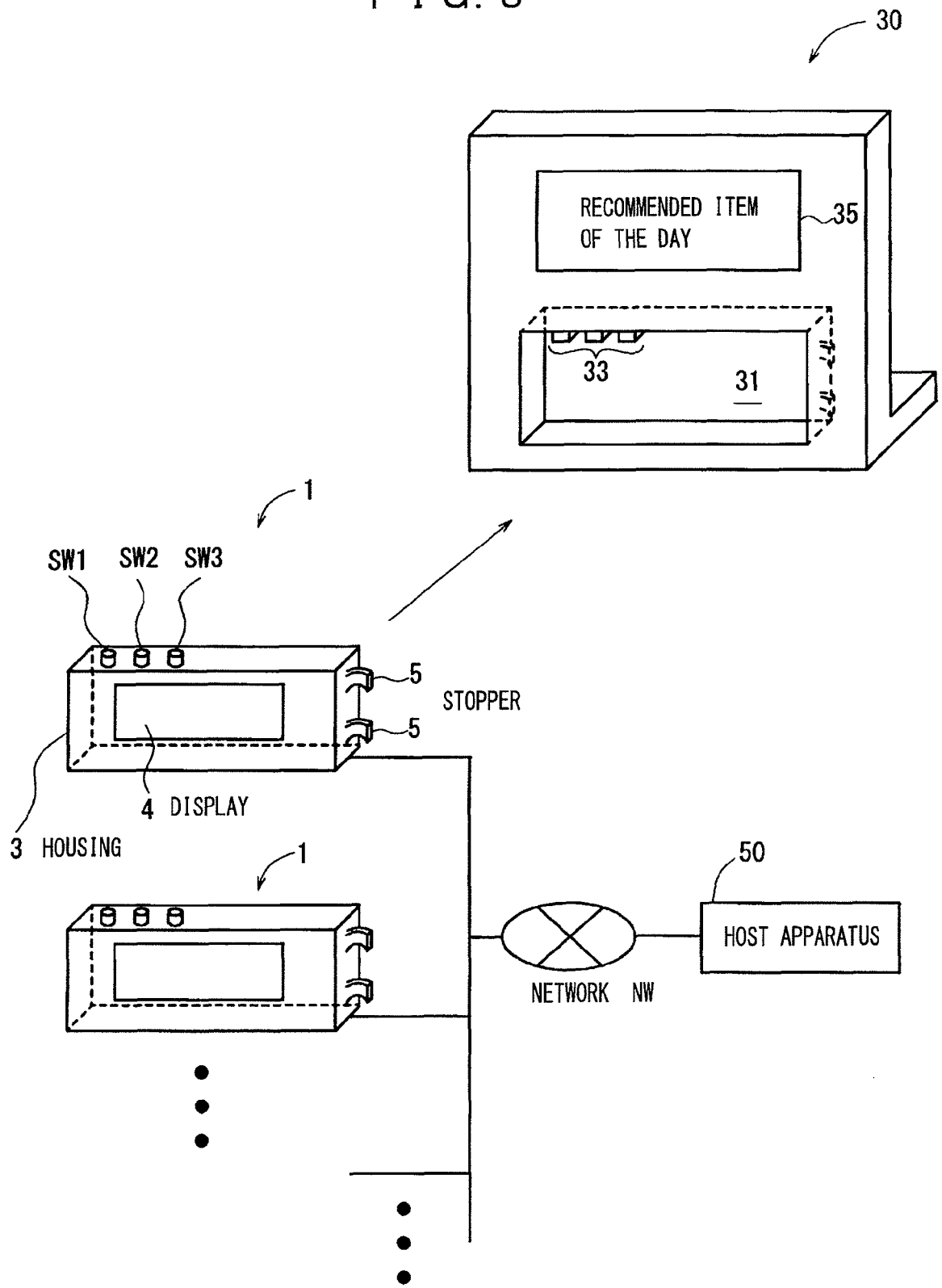
FIG. 8 is an entire configuration diagram of a management system for an electronic price tag device according to another embodiment.

FIG. 8 shows a management system SY according to another embodiment. The management system SY is formed of a plurality of electronic price tag devices 300, a POP panel 30 on which each electronic price tag device 300 is mounted, and a host apparatus 50 that controls the electronic price tag devices 300 through a network NW. The host apparatus 50 may be the above-mentioned server computer 20.

FIG. 9 shows functional elements of the electronic price tag device 300.

A control unit 11 is connected with a detecting unit 16 having microswitches SW1, SW2, and SW3. The control unit 11 includes a status information generator 13 that generates type information indicating a type of a POP panel, a display driver 12, and a data processing unit (not shown). The status information generator 13 generates status information including existence of the POP panel and the type information of the POP panel, corresponding to an ON or OFF signal from each of the microswitches SW1, SW2, and SW3. This status information is output to the host apparatus 50 by a data sending unit 15 through an interface 17 and the network NW. The status information also includes an operating state (ON or OFF) of the electronic price tag device besides the above-mentioned type information of the POP panel.

A data receiving unit 19 receives control data sent from the host apparatus 50. This control data includes the price information. Based on this price information, a price of a commodity is displayed on a display 4. In an ID storing unit 6, an ID for identifying the electronic price tag device is stored for each electronic price tag device.

Figure 10:
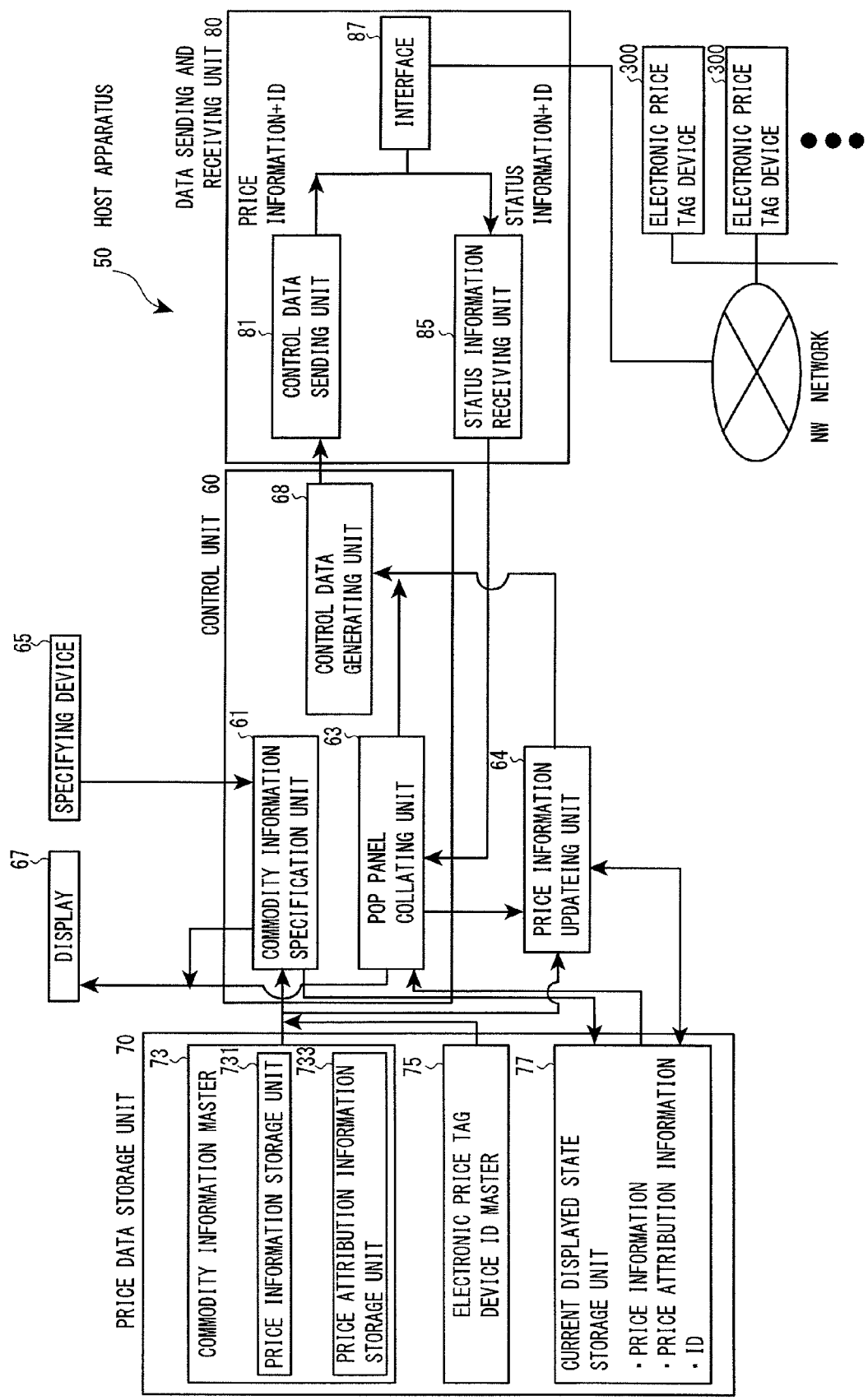
FIG. 10 is a block diagram showing a configuration of a host apparatus according to another embodiment.

FIG. 10 shows a configuration of the host apparatus 50.

The host apparatus 50 is formed of a general-purpose computer apparatus for a server. Functionally, the host apparatus 50 is formed of a control unit 60, a price data storage unit 70, and a data sending and receiving unit 80.

The control unit 60 includes a commodity information specification unit 61 and a POP panel collating unit 63. When a commodity, attribution information of the commodity, and the ID of the electronic price tag device 300 used for the commodity are specified by a specifying device 65 formed of an input device, such as a keyboard, a mouse, a bar code reader, the commodity information specification unit 61 reads the price information and price attribution information (see FIG. 3) of the commodity from a commodity information master 73 of the price database storage unit 70. Simultaneously, the commodity information specification unit 61 reads a target electronic price tag device ID from an electronic price tag device ID master 75, associates the price information and price attribution information of the commodity with the electronic price tag device ID, and stores these in a current displayed state storage unit 77. The relationship between the type information and the price attribution information shown in FIG. 3 is stored in a price attribution information storage unit 733.

Preferably, the content stored in the current displayed state storage unit 77 is displayed also on a display 67 for convenience in checking by an administrator of the host apparatus 50.

Based on the ID of the electronic price tag device sent from the electronic price tag device 300, the POP panel collating unit 63 compares the price attribution information associated with the ID and stored in the current displayed state storage unit 77 with the type information of the POP panel included in the status information. At this time, the relationship of FIG. 3 stored in the price attribution information storage unit 733 is referred to. The type information and price attribution information of the POP panel have the one-to one relationship as shown in FIG. 3. Therefore, when the type information and the price attribution information compared therewith are consistent (when both are in the relationship of FIG. 3), the POP panel collating unit 63 identifies at least the price information (corresponding to the commodity information) and the ID of the electronic price tag device, and outputs the price information and the ID of the electronic price tag device to a control data generating unit 68. The control data generating unit 68 generates control data including the price information and the ID, and outputs the control data to a control data sending unit 81. The control data includes data for specifying display modes (font, etc.), a display period, or the like as well as the price information and the ID information. This control data sending unit 81 sends the control data to each electronic price tag device 300 through an interface 87 and the network NW. The electronic price tag device 300 having an ID that coincides with the specified ID displays the price information on the display 4.

On the other hand, when there is inconsistency between both information compared (when the relationship between the both deviates from the relationship of FIG. 3 and the both are inconsistent), the information update command, which is a signal indicating that there is inconsistency, and the type information of the POP panel are output to a price information updating unit 64. The price information updating unit 64 updates the price information based on the type information of the POP panel, and outputs the updated price information (corresponding to the commodity information) and the ID of the electronic price tag device to the control data generating unit 68 The control data generating unit 68 generates control data including the updated price information and the ID, and outputs the control data to the control data sending unit 81. The control data sending unit 81 sends the control data to a group of the electronic price tag devices 300 through the interface 87 and the network NW. The electronic price tag device 300 having the ID that coincides with the specified ID displays the updated price information on the display 4. The price information updating unit 64, the control data generating unit 68, and the control data sending unit 81 configure an update commodity information outputting unit.

Moreover, preferably, the display 67 of the host apparatus 50 displays inconsistency between the type information and the price attribution information and the ID of the electronic price tag device in which the inconsistency occurs, and simultaneously, displays that the inconsistency is corrected and the display of the electronic price tag device is updated.

A flow chart in FIG. 11 provides a summary of operation of the management system SY of the electronic price tag device 300 according to the embodiment.

In the host apparatus 50, when the commodity and the price attribution information of the commodity are specified using the specifying device 65, the price information of the commodity is identified based on the specified attribution information. When the ID of the electronic price tag device is further specified using the specifying device 65 (Step 41), the price information and the price attribution information as well as the ID of the electronic price tag device are stored in the current displayed state storage unit 77 (Step 42).

For example, when a commodity A and price attribution information "30% OFF" are specified, the price of the commodity A stored in a price information storage unit 731 of the commodity information master 73 is multiplied by a discount rate (in this case, 70%) corresponding to the price attribution information "30% OFF" that is stored in the price attribution information storage unit 733. Then, this calculated price is stored in the current displayed state storage unit 77 as the price information together with the price attribution information and the ID of the electronic price tag device that is supposed to display the price information.

On the other hand, in the electronic price tag device 300, the status information generator 13 generates the status information based on the detection result by the detecting unit 16 (Step 43). At Step 44, the status information including the type information of the POP panel is sent to the host apparatus 50, together with the ID of the electronic price tag device 300.

At Step 45, in the host apparatus 50 that has received the status information+the ID information, the POP panel collating unit 63 reads the price attribution information having an ID identical with the received ID from the current displayed state storage unit 77, and the host apparatus 50 checks consistency between both information (POP panel type information included in the status information and price attribution information).

When the both are consistent with each other, the price information and the ID that are read from the current displayed state storage unit 77 are output to the control data generating unit 68. The control data generating unit 68 generates the control data including the price information and the ID, and outputs the control data to the control data sending unit 81. The control data sending unit 81 sends the control data to the group of the electronic price tag devices (Step 46).

In each of the electronic price tag devices 300 that has received the control data, the control unit 11 of the electronic price tag device compares the ID included in the control data with the ID of the electronic price tag device stored in the ID storing unit 6, and only when both of the IDs coincide, the price information of the control data is displayed on the display 4 (Step 49 and Step 50).

When the POP panel type information is inconsistent with the price attribution information (Step 45: N), the type information of the POP panel and the ID of the electronic price tag device mounted on the POP panel are output to the price information updating unit 64 as an error signal. The price information updating unit 64 identifies the price attribution information corresponding to the obtained type information with reference to the relationship of FIG. 3 stored in the commodity attribute information storage unit 733, and updates the price information using the price attribution information (Step 47).

For example, when the commodity A and the price attribution information ("30% OFF") are specified for a predetermined electronic price tag device 300 using the specifying device 65, but the type information of the POP panel on which this electronic price tag device is mounted is the type information corresponding to the price attribution information "sale item of the day," the price information is updated by multiplying the price information of the price of the commodity A with a predetermined discount rate (in this case, 50%) based on the price attribution information "sale item of the day" identified from the type information. This updated price information and the ID are output to the control data generating unit 68. The control data generating unit 68 generates the control data including this updated price information and the ID, and outputs the control data to the control data sending unit 81. The control data sending unit 81 sends the control data to the group of the electronic price tag devices (Step 46).

In each of the electronic price tag devices 300 that has received the control data, the control unit 11 of the electronic price tag device compares the ID included in the control data with the ID of the electronic price tag device stored in the ID storing unit 6, and only when both of the IDs coincide, the updated price information included in the control data is displayed on the display 4 (Step 49 and Step 50).

On the other hand, also in the host apparatus 50, the electronic price tag device in which inconsistency occurs between the type information of the POP panel and the price attribution information, namely, an error occurs is displayed on the display 67 (Step 48). While performing the display, it is preferable to display that the inconsistency is eliminated and the displayed data is updated.

While only the price information is used as the commodity information in the present embodiment, the commodity information can include other information on commodities, such as a trade mark, a name of manufacturer, and a use-by date. Then, the electronic price tag device can display the other information together with or separated from the price information.

Moreover, in the present embodiment, it is characteristic to update the price information, when the price attribution information that is the current displayed content is compared with the type information of the POP panel acquired from the electronic price tag device and the price attribution information is inconsistent with the type information. However, it is possible to send command data that instructs the electronic price tag device transmission of the status information to collectively switch to the price attribution information corresponding to the type of the POP panel based on the status information acquired from the electronic price tag device, and it is also possible to update the data of the commodity attribute information storage unit 733.

Furthermore, in the present embodiment, when the price attribution information that is the current displayed content is inconsistent with the type information of the POP panel acquired from the electronic price tag device, the price attribution information and the price information are updated according to the type information of the POP panel. However, in this case, an error signal indicating that the electronic price tag device also has inconsistency may be sent, and when an operation to consent to update the price information is performed on the electronic price tag device side, the price information may be updated. With this configuration, it is possible to prevent update of the price information by mistake, which is caused by mounting the POP panel by mistake.

The present invention will not be limited to the embodiments and examples described above at all. The present invention also includes various modified aspects within a range where the modified aspects may easily occur to those skilled in the art without deviating from description of the scope of the appended claims.

The invention claimed is:

1. An electronic price tag device that electronically displays at least a price of a commodity and is formed so as to be attachable to a POP panel, the electronic price tag device comprising:
 a detecting unit that detects a panel identification unit of the POP panel; and
 an outputting unit that outputs a type of the POP panel that is a detected result by the detecting unit.

2. The electronic price tag device according to claim 1, wherein
 the detecting unit comprises a detecting element, and
 the detecting element engages with the panel identification unit provided to the POP panel to output an ON signal or OFF signal, and identifies a type of the POP panel based on the ON signal or OFF signal.

3. The electronic price tag device according to claim 1 or 2, wherein
 the outputting unit sends the type of the POP panel detected in the detecting unit to a central management device.

4. The electronic price tag device according to claim 2, wherein
 the detecting unit has a plurality of detecting elements, and is formed to detect whether the POP panel is mounted, as well as the type of the POP panel.

5. A POP panel that is to be attached with an electronic price tag device including a detecting unit, the POP panel comprising:
a panel identification unit provided at a position, with the electronic price tag device attached thereto, facing the detecting unit of the electronic price tag device.

6. The POP panel according to claim 5, wherein
a sensor of the detecting unit of the electronic price tag device is a mechanical switch, and
the panel identification unit is a projected and recessed part that engages with the switch to turn the switch to an ON state or OFF state.

7. A management system for an electronic price tag device, the management system comprising:
the electronic price tag device that electronically displays at least a price of a commodity and is formed so as to be attachable to a POP panel; and
a host apparatus having a function to send price information of the commodity corresponding to the electronic price tag device;
the electronic price tag device comprising:
a detecting unit that detects a panel identification unit of the POP panel; and
a sending unit that sends a type of the POP panel that is a detected result by the detecting unit;
the host apparatus comprising:
a specification unit that specifies a type of the electronic price tag device;
a comparison unit that compares the specified type of the electronic price tag device with the type of the POP panel received from the electronic price tag device; and
a warning displaying unit that displays a warning when the specified type of the electronic price tag device is inconsistent with the type of the POP panel.

8. A management system for an electronic price tag device, comprising:
the electronic price tag device that electronically displays at least a price of a commodity and is formed so as to be attachable to a POP panel; and
a host apparatus having a function to send price information of the commodity corresponding to the electronic price tag device;
the host apparatus comprising:
a specification unit that specifies a type and price of the electronic price tag device; and
a sending unit that sends the specified type and price of the electronic price tag device;
the electronic price tag device comprising:
a detecting unit that detects a panel identification unit of the POP panel;
a comparison unit that compares a type of the POP panel that is a detected result by the detecting unit with the type of the electronic price tag device received from the host apparatus; and
a display unit that displays the received price when the type of the POP panel coincides with the type of the electronic price tag device, and displays a warning when the type of the POP panel does not coincide with the type of the electronic price tag device.

9. The management system for an electronic price tag device according to claim 8, wherein
the electronic price tag device further comprises a sending unit that sends a comparison result when the type of the POP panel and the type of the electronic price tag device do not coincide on a basis of the comparison result by the comparison unit, and the host apparatus further comprises a display unit that displays the comparison result sent from the electronic price tag device.

10. A management system for an electronic price tag device, the management system comprising:
a plurality of electronic price tag devices, each of which electronically displays at least a price of a commodity and is formed so as to be attachable to a POP panel; and
a host apparatus having a function to send commodity information including price information of the commodity corresponding to the electronic price tag devices;
the POP panel comprising a panel identification unit that indicates type information corresponding to a content displayed by the POP panel,
the electronic price tag device comprising:
a data receiving unit that receives control data including the commodity information from the host apparatus;
a display unit that displays at least the price information included in the commodity information;
a detecting unit that detects the panel identification unit of the POP panel; and
a data sending unit that outputs status information, including existence of the POP panel and the type information of the POP panel that are detected results by the detecting unit, to the host apparatus;
the host apparatus comprising:
a price data storage unit that stores at least each pieced of the price information of the electronic price tag devices in accordance with price attribution information;
a control data sending unit that sends control data including the commodity information to the electronic price tag device;
a status information acquiring unit that acquires the status information from the electronic price tag device; and
an update commodity information outputting unit that sends the commodity information corresponding to the type information of the POP panel to the electronic price tag device based on the status information.

11. The management system for an electronic price tag device according to claim 10, wherein
the host apparatus further comprises a POP panel collating unit that collates the type information of the POP panel included in the status information with the price attribution information,
the POP panel collating unit outputs an information update command when the type information is inconsistent with the price attribution information, and
the update commodity information outputting unit sends the commodity information to a predetermined electronic price tag device according to the information update command.

12. A method for controlling a management system for an electronic price tag device that includes:
a plurality of electronic price tag devices, each of which electronically displays at least a price of a commodity and is formed so as to be attachable to a POP panel; and
a host apparatus having a function to send commodity information including price information of the commodity corresponding to the plurality of electronic price tag devices;

the method comprising:

detecting existence of the POP panel and a type of the POP panel;

acquiring status information of the electronic price tag device including information on existence of the POP panel and the type of the POP panel that are detected; and sending the commodity information corresponding to the type information of the POP panel to the electronic price tag device based on the acquired status information.

13. A program that enables a computer to execute each step in the method for controlling a management system for an electronic price tag device as claimed in claim 12.

* * * * *